Oct. 4, 1932.   W. A. MORTON   1,881,388
RECUPERATOR FOR INDUSTRIAL FURNACES
Filed Aug. 1, 1928
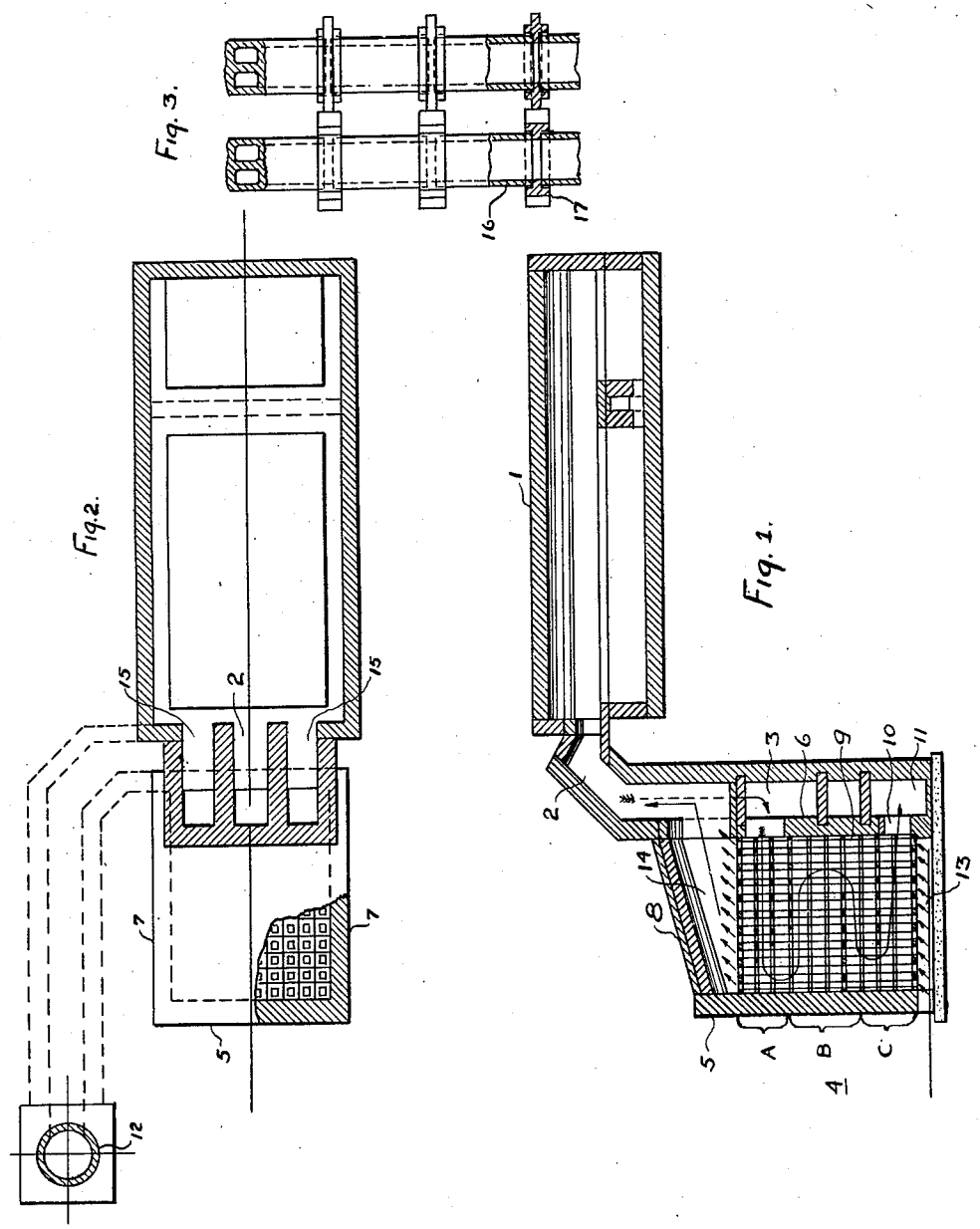
INVENTOR
William A. Morton
BY William B. Jaspert.
ATTORNEY Patented Oct. 4, 1932

1,881,388

UNITED STATES PATENT OFFICE

WILLIAM A. MORTON, OF PITTSBURGH, PENNSYLVANIA, ASSIGNOR TO AMCO, INCORPORATED, OF PITTSBURGH, PENNSYLVANIA, A CORPORATION OF PENNSYLVANIA

RECUPERATOR FOR INDUSTRIAL FURNACES

Application filed August 1, 1928. Serial No. 296,808.

This invention relates to recuperators for industrial furnaces and it is among the objects thereof to construct the air tubes or flues of recuperators of composite bodies which are so arranged and designed that the tubes adjacent the zone of highest temperature of the waste gases are composed of material which is neutral to corrosive fluxes at high temperatures, and the tubes of the subsequent gas passages are composed of material which is neutral to corrosive fluxes at lower temperatures and which is highly conductive.

In recuperator structures, a series of refractory tubes are arranged to form passages for waste gases, the heat of which is utilized in preheating air that is conducted to the furnace with which the recuperator is associated. The waste gases constituting the heating medium are passed back and forth around the tube structure and finally passed out at the waste stack. The hot gases particularly from furnaces using corrosive fluxes, as in glass smelting furnaces, have a tendency to burn the interior structure of the recuperator adjacent the inlet of the waste furnace gases.

Ordinary refractory materials such as refractory clays, even though they be resistant to high temperatures, are destroyed by the erosive vapors which are present in the waste furnace gases, and in accordance with the present invention it is proposed to construct the recuperators so that the portion constituting the initial passage for the high temperature waste gases, is resistive to the corrosive fluxes. The portion constituting the subsequent passage of the waste gases can be manufactured of materials resistant to corrosive gases at lower temperatures and the portions of the recuperator tube structure which constitutes the final pass of the gases may be made of material which is highly conductive and less resistant to corrosive action, since in the final pass, the temperature of the gases has been materially reduced.

The advantage of utilizing a combination of materials in a recuperator structure, as herein proposed, results in the economy effected by the employment of relatively expensive and durable materials in the portion of the recuperator subject to the high temperature gases, and less expensive materials throughout the tube structure in accordance with the temperature drop of the gases passing therethrough.

In the accompanying drawing constituting a part hereof, and in which like reference characters designate like parts, Fig. 1 is a vertical longitudinal section of a recuperator embodying the principles of this invention; Fig. 2 is a longitudinal sectional view partially in elevation; and Fig. 3 is a sectional elevational view of a portion of the tile stack illustrating the relative position of the flue and flange tiles.

Referring to Fig. 1 of the drawing, the furnace structure is generally designated at 1 and is provided with a combustion passage 2 leading to the inlet chamber 3 of a recuperator, generally designated at 4. The recuperator is provided with front and rear walls 5 and 6, respectively, side walls 7, and an arched roof 8. A plurality of tile stacks 9 are built within the walls of the recuperator as shown and the recuperator is provided with an outlet passage for the waste gases at 10 leading to a waste passage 11 that communicates with a stack 12. An air inlet chamber 13 is provided at the lowermost portion of the recuperator and an air chamber 14 at the top of the recuperator through which the preheated air passes to the furnace 1 through the passages 15, shown in Fig. 2.

The tile stack is more clearly illustrated in connection with Fig. 3 of the drawing, in which the flue tile 16 is shown supported by flange tiles 17 to form sealed joints in the manner disclosed in my Patent No. 1,587,171, granted to me on June 1, 1926.

The waste gases pass through the combustion passage 2 into the inlet chamber 3 of the recuperator from which it passes through the tile stack in the manner shown by the waved lines and out the waste passage to the stack.

In accordance with the present invention I construct the upper portion A of the tile stack of a material which is nuetral to the corrosive fluxes in the waste gases coming from the furnace, suitable material for this purpose being sillimanite $Al_2O_3SiO_2$ or mullite $3Al_2O_3 2SiO_2$. The portion B of the tile stack below that forming the inlet passage of the waste gases I construct of suitable refractory clays which are resistant to the corrosive fluxes at lower temperatures, since in this passage of the waste gases the temperatures of the gases are below that at which the flux would attack the refractory clay substance. The lowermost portion C of the stack I construct of a highly conductive material such as metal which need not be resistant to the corrosive fluxes since they would not affect the material on account of the relatively low temperature of the gases at the lower portion of the tile stack. The employment of highly conductive material at the lower portion of the tile stack produces maximum efficiency in heat exchange.

No particular portion of the recuperator has been designated as being constructed of the various kinds of materials mentioned, but the divisions has been generally indicated by brackets in Fig. 1 of the drawing. The proper combination of materials is dependent upon the number of passages through which the waste gases are to be conducted, the length of such passages for effecting such a drop in temperature of the gases as would permit the use of less expensive refractory materials, and the initial temperature at which the gases are conducted to the recuperator.

The substitution of materials which are highly refractory to excessive temperatures and of special non-corrosive composition, such as the sillimanite or mullite, for refractory clay tile stacks, as heretofore employed, will prevent their destruction and greatly extend the life of the tile, thereby eliminating the necessity for frequent renewals, and although the initial cost of such combination tile stack structures is in excess of that of the common refractory clay structures, the additional life and the continuous operation of the recuperator is well worth the difference in cost, and over a long period of operation is less expensive than the use of the cheaper materials for the tile stack.

In the final passage of the waste gases, cast iron, steel, or carborundum tile may be employed, these materials being more or less permanent and of a highly conductive nature, whereby a maximum amount of heat is absorbed from the lower temperature waste gases passing into the waste passage to the stack.

Although one embodiment of the invention has been herein illustrated and described, it will be obvious to those skilled in the art that various modifications may be made in the details of construction and that various combinations of materials may be employed in the tile stack without departing from the principles herein set forth.

I claim:

1. In a recuperator applied to a melting furnace using corrosive fluxes, a series of air tubes forming successive passages for waste gases in which the tubes constituting the initial passage are of aluminum silicate, the tubes of the subsequent passage of clay, and the tubes of the final passage of metal.

2. A recuperator structure for high temperature melting furnaces in which corrosive waste gases are generated, comprising in combination a series of air and gas flues constructed of refractory tile forming continuous air and waste gas passages in heat exchange relation, the tile forming the initial passages for the hot waste gases comprising flux resisting material composed of aluminum silicate and the tile forming the subsequent passages comprising refractory clay.

In testimony whereof I have hereunto set my hand this 30th day of July, 1928, at Pittsburgh, Pa.

WILLIAM A. MORTON.